Dec. 14, 1937.  G. A. LYON  2,102,471
VEHICLE WHEEL AND COVER PLATE
Original Filed Sept. 20, 1934
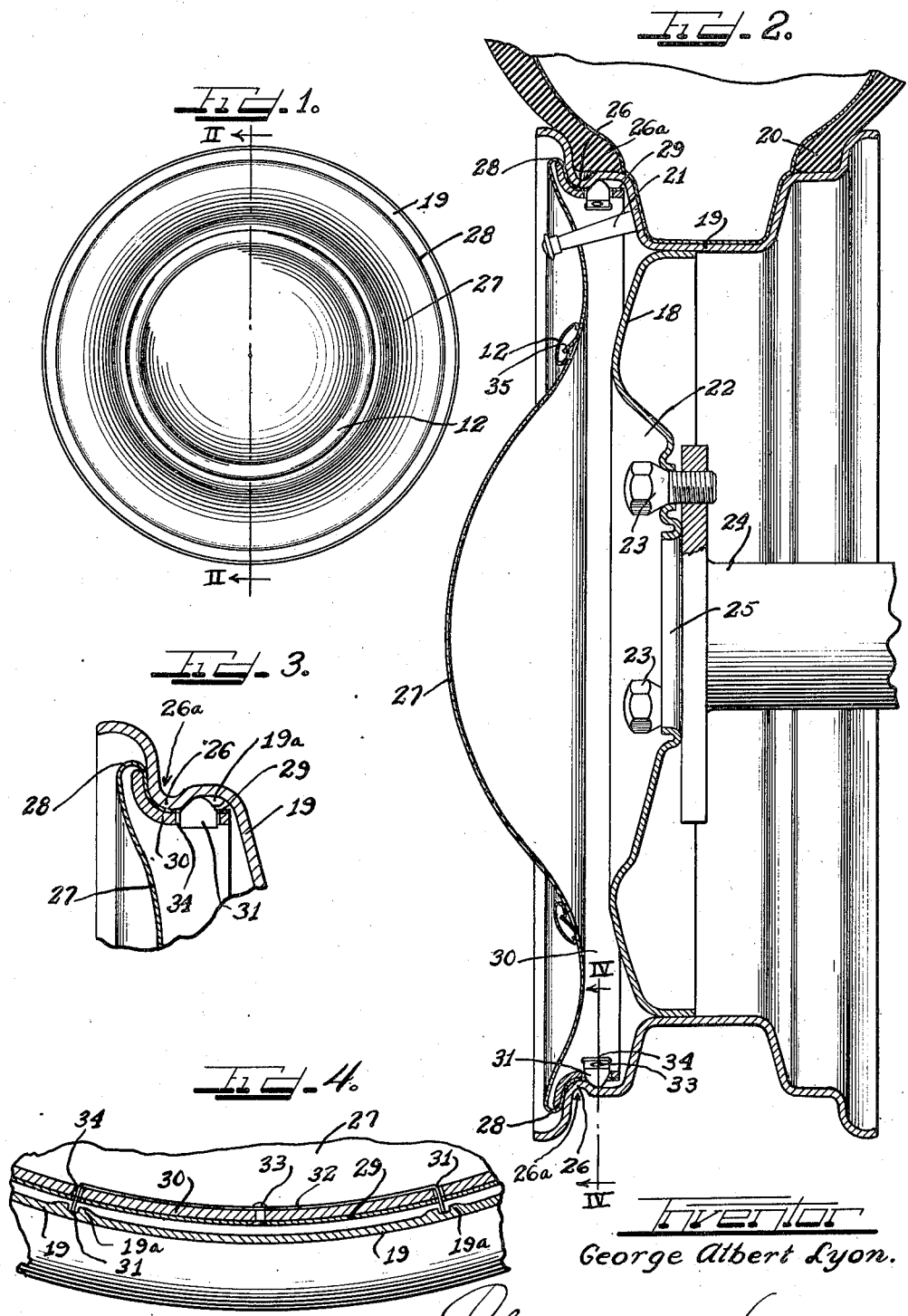
George Albert Lyon Patented Dec. 14, 1937

2,102,471

UNITED STATES PATENT OFFICE 2,102,471

VEHICLE WHEEL AND COVER PLATE

George Albert Lyon, Allenhurst, N. J.

Original application September 20, 1934, Serial No. 744,758. Divided and this application September 9, 1935, Serial No. 39,709

4 Claims. (Cl. 301—37)

This invention relates to improvements in ornamental discs or side plates for application to the outer side surface of a vehicle wheel to ornament the wheel in keeping with the other external appointments of the vehicle and also for the purpose of protecting the wheel in the manner of a hub cap, including covering and protecting interstices, cracks or gaps between the relative parts of the wheel to prevent the accumulation of dirt therein.

This application is a division of my copending application entitled "Ornamental rings for disc wheels", filed September 20, 1934, Serial No. 744,758.

It is an object of this invention to provide new and novel means for attaching a wheel disc to a wheel rim, the disc functioning as an ornamental member overlying the structural body part of the vehicle wheel, and protecting the gap or crevice between this body or supporting plate and the rim to which it is attached.

Another object of the invention is the provision of a disc of the character described herein for snap-on engagement with a wheel rim, the disc being arranged to cover the entire outer side surface of the wheel inside the rim, thus eliminating the use of a conventional hub cap.

Also an object of this invention is the provision of a cover plate for snap-on engagement with a wheel rim, the plate overlying the outer side surface of the wheel and being readily attached to the wheel by a simple pressing operation and equally as readily removed from the wheel by the simple expedient of inserting a prying tool between the peripheral edge of the cover plate and the rim and prying against the rim.

It is also an object of this invention to provide a vehicle rim construction shaped to accommodate and aid in holding a cover plate attached to a wheel, and also to enhance the easy removal of the tire from the rim.

Still a further object of this invention is the provision of a vehicle wheel and cover plate therefor, wherein the rim of a wheel is shaped to accommodate snap-on engagement means associated with the cover plate, the shaping of the rim also enhancing the facility with which a tire may be removed from the rim, and means being associated with the structure to prevent relative rotation of the cover plate and wheel.

Other objects and features of this invention will more fully appear from the following detailed description taken in connection with the accompanying drawing which illustrates a single embodiment thereof, and in which:

Figure 1 is a side elevational view of a combination structure including the wheel and disc or cover plate in assembled operative position and embodying the principles of the present invention.

Figure 2 is an enlarged fragmentary vertical sectional view through the structure of Figure 1, taken substantially as indicated by the line II—II of Figure 1, looking in the direction of the arrows.

Figure 3 is a greater enlarged view of a part of the structure of Figure 2.

Figure 4 is an enlarged fragmentary sectional view taken substantially as indicated by the line IV—IV of Figure 2, looking in the direction indicated by the arrows.

In the drawing, I have illustrated a new form of wheel and cover plate construction embodying principles of the present invention. In some instances, it is desirable to embellish or ornament the cover plate to further enhance the appearance of the wheel and, if so desired, to simulate a hub cap. Accordingly, the present invention also contemplates the provision of such ornamentation to the cover plate.

The reference numeral 18 indicates an inner main supporting plate for the vehicle wheel, this plate being provided with a circumferential flange which is secured in any desired manner to a tire rim 19 adapted to support a tire and tube unit 20 in the usual manner, with the valve stem 21 projecting through a suitable aperture in the rim. The central portion of the plate 18 is provided with a plurality of indentations 22, at the base of each of which a suitable aperture is provided for the accommodation of a bolt 23, by means of which the entire wheel structure may be attached to a spare wheel supporting bracket 24, as illustrated, or to the usual wheel supporting element upon the axle of a vehicle. A central aperture 25 in the plate 18 provides an opening for the end of the wheel spindle.

Adjacent the outer portion thereof, namely, in one of the lateral flanges, the drop-center type tire rim 19 is provided with shoulder means 26 formed integrally in the rim for a purpose that will be later apparent herein.

A great portion of the tire rim and everything within the circle defined thereby is covered by means of a covering shell 27, preferably bellied outwardly in the central region to properly overlie the opening 25 and enhance the appearance of the construction. The shell or cover plate 27 is preferably made of a single piece of metal and has the outer marginal portion thereof reversely folded to provide a circumferential flange 28 which lies against the adjacent portion of th rim 19 when the shell is in position upon the wheel. A circumferential flange 29 extends laterally inwardly from the reversely bent marginal portion, and this flanged part 29 is supported and stiffened by a circumferential reinforcing element 30.

The side plate 27 is removably held in position by means of substantially triangular-shaped heads 31 upon a leaf spring 32, secured at an intermediate point in any suitable manner, such as by rivets 33 to the inner surface of the supporting member 30. As indicated at 34, the supporting element 30 and the flange 29 are apertured to accommodate the heads 31 of the spring 32, each head 31 projecting through its respective aperture and beyond the flanged portion 29 for engagement with the undersurface of the tire rim 19. The rim 19 is preferably provided with spaced pairs of lugs 19a just within the shoulder means 26, each head 31 on the spring 32 seating between the lugs of a pair to prevent relative rotation between the shell 27 and the rim (Figure 4). Of course, as many leaf spring retaining structures as may be deemed necessary are utilized.

As seen more clearly in Figures 2 and 3, the entire shell or cover plate 27 may be mounted upon the rim by merely pressing it into place, the pressing action causing the heads 31 upon the springs 32 to be moved inwardly until they have cleared the annular bead 26 of the rim, whereupon they will snap outwardly, engaging behind the bead, and hold the shell in position. Of course, the shell is provided with a suitable aperture through which the valve stem 21 may extend, and the lugs 19a upon the rear surface of the bead 26 eliminate undue sidewise pressure against the valve stem which would perhaps result in the event relative rotation between the shell and rim was permitted. To remove this cover plate, it is a simple expedient to insert a screw driver or some similar prying tool behind the bead 28 of the shell and pry against the rim 19 to force the shell off the wheel, the sloping walls of the heads 31 permitting in and out movement of the shell.

As seen best in Figures 2 and 3, lugs 35 may be struck at spaced points from the material of the shell so as to extend outwardly, and a decorative band 12 may be mounted in position in engagement with these lugs. When the lugs are properly positioned, the application of the band will provide the shell with an external appearance in simulation of a hub cap, it obviously not being necessary to utilize a conventional hub cap with the type of cover plate shown herein. The ring or band 12 is preferably of a split ring character having open ends inclined to separate by the inherent resiliency of the band. The band has an outer arcuate portion and an underturned marginal portion, the latter engaging with the lugs and the former concealing such engagement. It is a simple expedient to snap the band in position upon the lugs, as seen in Figure 2, and the inherent resiliency of the band retains it in such position. Of course, the band may be of any desirable or suitable character and may be any of the types of bands set forth and claimed in my aforesaid copending application.

Another feature of this invention resides in the rim construction, namely, that the formation of the annular bead or shoulder 26 results in the creation of an external annular groove 26a in the outer surface of the rim. As seen clearly in Figure 2, this groove 26a underlies the lower edge of the vehicle tire which does not extend into the groove sufficiently to plug the same. Accordingly, the formation of the shoulder 26 not only establishes means for holding the cover plate or shell 27 upon the wheel, but also provides a groove adjacent the tire holding portion of the rim into which a prying tool may be easily inserted between the tire and outer portion of the rim. By so inserting a prying tool so that the end of the tool projects into the groove 26a, the tire may be removed from the rim with much greater ease and facility.

From the foregoing, it will be apparent that I have provided a novel composite wheel and cover plate construction, including a peculiar wheel construction which lends itself to the holding of a disc or cover plate upon the wheel by novel means, and also augments the ease and facility with which a tire may be removed from the rim. It will be further noted that the cover plate is simple in its construction, effective in operation and may be embellished or ornamented in any desirable manner without interference with its utility and ease of handling. Further, the structure is durable and economical to manufacture.

Now I desire it understood that although I have illustrated and described in detail the preferred embodiment of this invention, the invention is not to be thus limited, but only insofar as defined by the scope and spirit of the appended claims.

I claim as my invention:

1. In combination, a vehicle wheel, and an ornamental disc of a size to cover the major portion of the side face of the wheel inside the tire rim and carrying retaining means for snap-on engagement with a part of the wheel adjacent the outer periphery thereof, said retaining means cooperating with means on the rim to prevent relative rotation therebetween and eliminate sidewise pressure against a tire valve stem member.

2. The combination with a wheel rim having inwardly projecting shoulder means, of a disc for covering the wheel inside said rim and having means for engaging behind said shoulder to hold the disc in a detachable position on the rim, said engaging means cooperating with means on the rim for preventing rotation of the disc relatively to the rim.

3. The combination with a wheel including a tire rim and tire, said rim having an integral bead formed therein defining a groove beneath the tire for receiving a tire tool and further defining an inwardly extending shoulder, of a cover plate for disposition over the side surface of the wheel and carrying snap-on attaching means engageable behind said shoulder, means behind said shoulder for preventing a rotation of the disc with respect to the rim.

4. In combination, a vehicle wheel including a tire rim having spaced pairs of axially extending lugs thereon, radially extending shoulder means on said rim in front of each pair of lugs, and a cover plate for disposition over the side surface of the wheel and carrying resilient detents for snap-on engagement behind said shoulder means with each detent seated between the lugs of one of said pairs to anchor said cover plate against rotation relatively to said wheel.

GEORGE ALBERT LYON.